United States Patent
Akiyama et al.

(10) Patent No.: US 9,130,680 B2
(45) Date of Patent: Sep. 8, 2015

(54) OPTICAL TRANSMITTER AND MODULATED OPTICAL SIGNAL GENERATING METHOD

(71) Applicant: FUJITSU LIMITED, Kawasaki-shi, Kanagawa (JP)

(72) Inventors: Yuichi Akiyama, Kawasaki (JP); Takeshi Hoshida, Kawasaki (JP); Tamotsu Akashi, Atsugi (JP); Yoshio Sakai, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/132,867

(22) Filed: Dec. 18, 2013

(65) Prior Publication Data
US 2014/0212136 A1 Jul. 31, 2014

(30) Foreign Application Priority Data
Jan. 31, 2013 (JP) ................................. 2013-017433

(51) Int. Cl.
| | |
|---|---|
| H04B 10/00 | (2013.01) |
| H04B 10/532 | (2013.01) |
| H04B 10/2513 | (2013.01) |
| H04B 10/50 | (2013.01) |

(52) U.S. Cl.
CPC .......... *H04B 10/532* (2013.01); *H04B 10/2513* (2013.01); *H04B 10/25137* (2013.01); *H04B 10/50597* (2013.01); *H04B 2210/254* (2013.01)

(58) Field of Classification Search
CPC .................... H04B 10/5561; H04B 10/50577; H04B 10/50597
See application file for complete search history.

(56) References Cited

U.S. PATENT DOCUMENTS

| | | | |
|---|---|---|---|
| 5,359,449 A * | 10/1994 | Nishimoto et al. ........... | 398/198 |
| 8,611,760 B2 * | 12/2013 | Nishihara et al. ............ | 398/188 |
| 2006/0193640 A1 * | 8/2006 | Katagiri et al. ............... | 398/188 |
| 2007/0047954 A1 * | 3/2007 | Mamyshev ..................... | 398/33 |

(Continued)

FOREIGN PATENT DOCUMENTS

| | | |
|---|---|---|
| EP | 1838064 A2 | 9/2007 |
| JP | 2006-270909 | 10/2006 |

(Continued)

OTHER PUBLICATIONS

Extended European Search Report dated May 27, 2014 in corresponding European Patent Application No. 13198024.5.

(Continued)

*Primary Examiner* — Danny Leung
(74) *Attorney, Agent, or Firm* — Staas & Halsey LLP

(57) ABSTRACT

An optical transmitter includes: an optical modulator including a first modulation unit and a second modulation unit respectively configured to propagate a first optical signal and a second optical signal that are obtained by splitting input light; a signal generator configured to generate a first drive signal and a second drive signal that are respectively supplied to the first modulation unit and the second modulation unit; a phase controller configured to control a phase difference between the first optical signal and the second optical signal in the optical modulator; and a phase difference detector configured to detect the phase difference between the first optical signal and the second optical signal controlled by the phase controller. The signal generator generates the first drive signal and the second drive signal based on the phase difference detected by the phase difference detector.

15 Claims, 12 Drawing Sheets

(56) References Cited

U.S. PATENT DOCUMENTS

| | | |
|---|---|---|
| 2007/0065161 A1* | 3/2007 | Miura et al. ............... 398/186 |
| 2007/0230617 A1* | 10/2007 | Tao et al. ................. 375/302 |
| 2014/0212136 A1* | 7/2014 | Akiyama et al. ............ 398/65 |

FOREIGN PATENT DOCUMENTS

| | | |
|---|---|---|
| JP | 2007-82094 | 3/2007 |
| JP | 2007-259426 | 10/2007 |
| JP | 2009-246578 | 10/2009 |

OTHER PUBLICATIONS

"5120-km RZ-DPSK Transmission Over G.652 Fiber at 10 Gb/s Without Optical Dispersion Compensation", McGhan et al., IEEE Photonics Technology Letters, vol. 18, No. 2, Jan. 2006, pp. 400-402.

"A Study on Automatic Bias Control for Arbitrary Optical Signal Generation by Dual-parallel Mach-Zehnder Modulator", Yoshida et al., ECOC 2010, Sep. 2010, 3 pp.

"Effect of Modulator Bias Control in the Presence of a Finite Extinction Ratio in DQPSK Pre-Equalization Systems", Sugihara et al., IEEE Photonics Technology Letters, vol. 24, No. 5, Mar. 2012, pp. 371-373.

* cited by examiner

| BIAS VOLTAGE (V) | 0 | 1.0 | 2.0 | 3.0 | 4.0 | 5.0 | 6.0 | 7.0 | 8.0 | 9.0 | 10.0 |
|---|---|---|---|---|---|---|---|---|---|---|---|
| MONITOR SIGN | POSI-TIVE | ZERO | NEGA-TIVE | NEGA-TIVE | NEGA-TIVE | ZERO | POSI-TIVE | POSI-TIVE | POSI-TIVE | ZERO | NEGA-TIVE |

FIG. 5

OPTICAL TRANSMITTER AND MODULATED OPTICAL SIGNAL GENERATING METHOD

CROSS-REFERENCE TO RELATED APPLICATION

This application is based upon and claims the benefit of priority of the prior Japanese Patent Application No. 2013-017433, filed on Jan. 31, 2013, the entire contents of which are incorporated herein by reference.

FIELD

The embodiments discussed herein are related to an optical transmitter and a modulated optical signal generating method.

BACKGROUND

In order to provide a next-generation long-distance large-capacity communication system, research and development have been made on a transmitter that generates modulated optical signals using digital signal processing. For example, the digital signal processing generates signals for a multi-level modulation format such as QPSK and QAM. Also, for example, the digital signal processing can generate signals for suppressing dispersion of an optical transmission line (that is, signals for dispersion pre-equalization). Then, an optical modulator is driven by the signals generated by the digital signal processing to generate large-capacity multi-level modulated optical signals.

FIG. 1 illustrates an example of an optical transmitter. An optical transmitter 1 illustrated in FIG. 1 includes a digital signal processor 11, D/A converters 12a and 12b, drivers 13a and 13b, a light source 14, and an optical modulator 15. The digital signal processor 11 generates a drive signal I and a drive signal Q from input data. The D/A converters 12a and 12b covert the drive signal I and the drive signal Q to an analog signal respectively. The drivers 13a and 13b drive the optical modulator 15 with the drive signal I and the drive signal Q outputted from the D/A converters 12a and 12b respectively. The light source 14 generates continuous wave light.

The optical modulator 15 includes an I arm modulation unit and a Q arm modulation unit. The continuous wave light generated by the light source 14 is split by an optical splitter and guided to the I arm modulation unit and the Q arm modulation unit. The I arm modulation unit modulates the continuous wave light in response to the drive signal I to generate an optical signal. The Q arm modulation unit modulates the continuous wave light in response to the drive signal Q to generate an optical signal. The two optical signals are combined to generate a modulated optical signal.

The optical modulator 15 is designed so that the phase difference between the I arm and the Q arm is $\pi/2+n\pi$ (where n is any integer including zero). More specifically, a bias voltage supplied to a phase shifter 15a is controlled so that the phase difference between light propagating through the I arm and light propagating through the Q arm is $\pi/2+n\pi$. Note that the method of controlling the phase difference between the I arm and the Q arm of the optical modulator so as to be $\pi/2$ is described, for example, in Japanese Laid-Open Patent Publication No. 2007-82094, Japanese Laid-Open Patent Publication No. 2009-246578, and Japanese Laid-Open Patent Publication No. 2007-259426.

However, in the adjustment of the phase difference between the I arm and the Q arm of the optical modulator (hereinafter referred to as an "I-Q phase difference" or a "phase shift amount of the phase shifter"), $\pi/2+n\pi$ and $3\pi/2+2n\pi$ are not distinguished. For example, the optical transmitter may generate the modulated optical signal in a state in which the I-Q phase difference is controlled to be either $\pi/2+2n\pi$ or $3\pi/2+2n\pi$. In light of this, the optical receiver decides whether the I-Q phase difference is either $\pi/2+2n\pi$ or $3\pi/2+2n\pi$, and then recovers data from the modulated optical signal. The optical receiver for receiving the modulated optical signal is described, for example, in Japanese Laid-Open Patent Publication No. 2006-270909.

The next-generation optical transmission system can provide an optical signal with various characteristics using the digital signal processing as described above. For example, the digital signal processing for generating a drive signal from the input data can perform dispersion pre-equalization, frequency offset addition, or the like.

However, when a parameter assuming that the I-Q phase difference is $\pi/2+2n\pi$ is supplied while the I-Q phase difference is controlled to be $3\pi/2+2n\pi$, the transmission characteristics of the optical signal may be degraded. For example, when chromatic dispersion assuming that the I-Q phase difference is $\pi/2+2n\pi$ is supplied while the I-Q phase difference is controlled to be $3\pi/2+2n\pi$, cumulative chromatic dispersion to be detected by the optical receiver may be greater than a case where wavelength pre-equalization is not performed.

SUMMARY

According to an aspect of the embodiments, an optical transmitter includes: an optical modulator including a first modulation unit and a second modulation unit respectively configured to propagate a first optical signal and a second optical signal that are obtained by splitting input light; a signal generator configured to generate a first drive signal and a second drive signal that are respectively supplied to the first modulation unit and the second modulation unit; a phase controller configured to control a phase difference between the first optical signal and the second optical signal in the optical modulator; and a phase difference detector configured to detect the phase difference between the first optical signal and the second optical signal controlled by the phase controller. The signal generator generates the first drive signal and the second drive signal based on the phase difference detected by the phase difference detector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of phase difference decision information;

DESCRIPTION OF EMBODIMENTS

Figure 1:
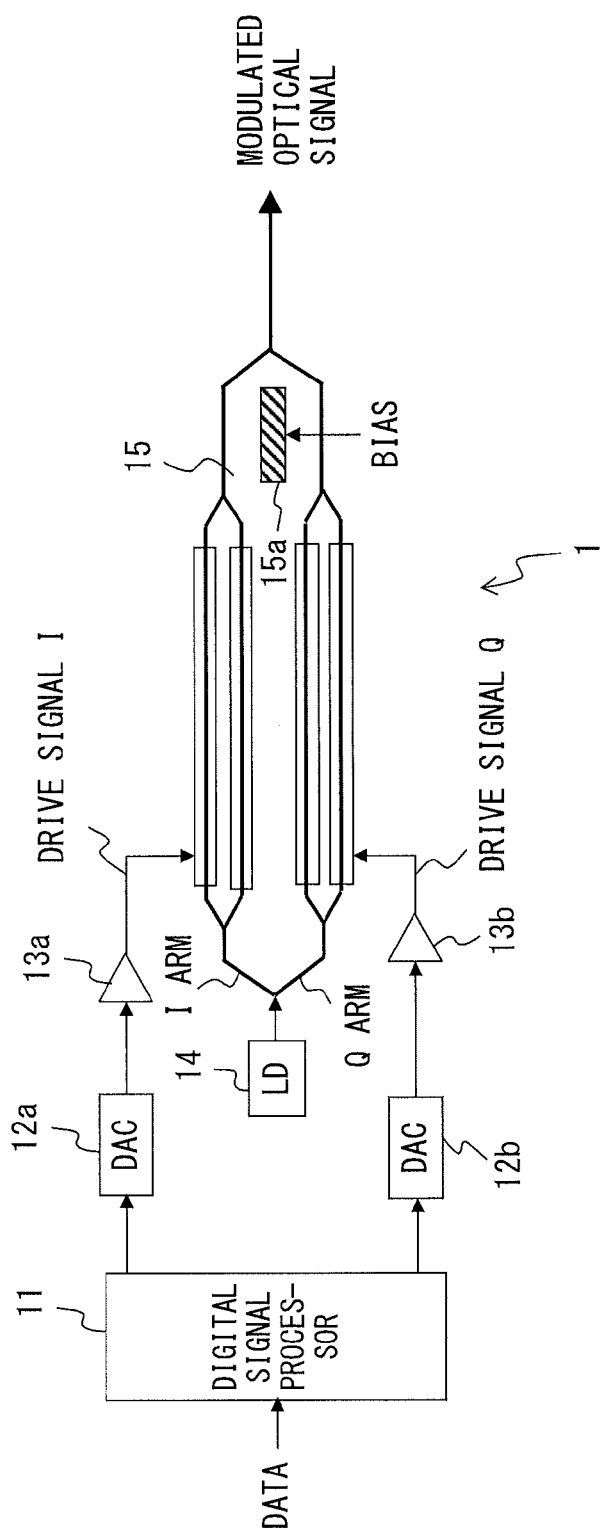
FIG. 1 illustrates an example of an optical transmitter.
Figure 2:
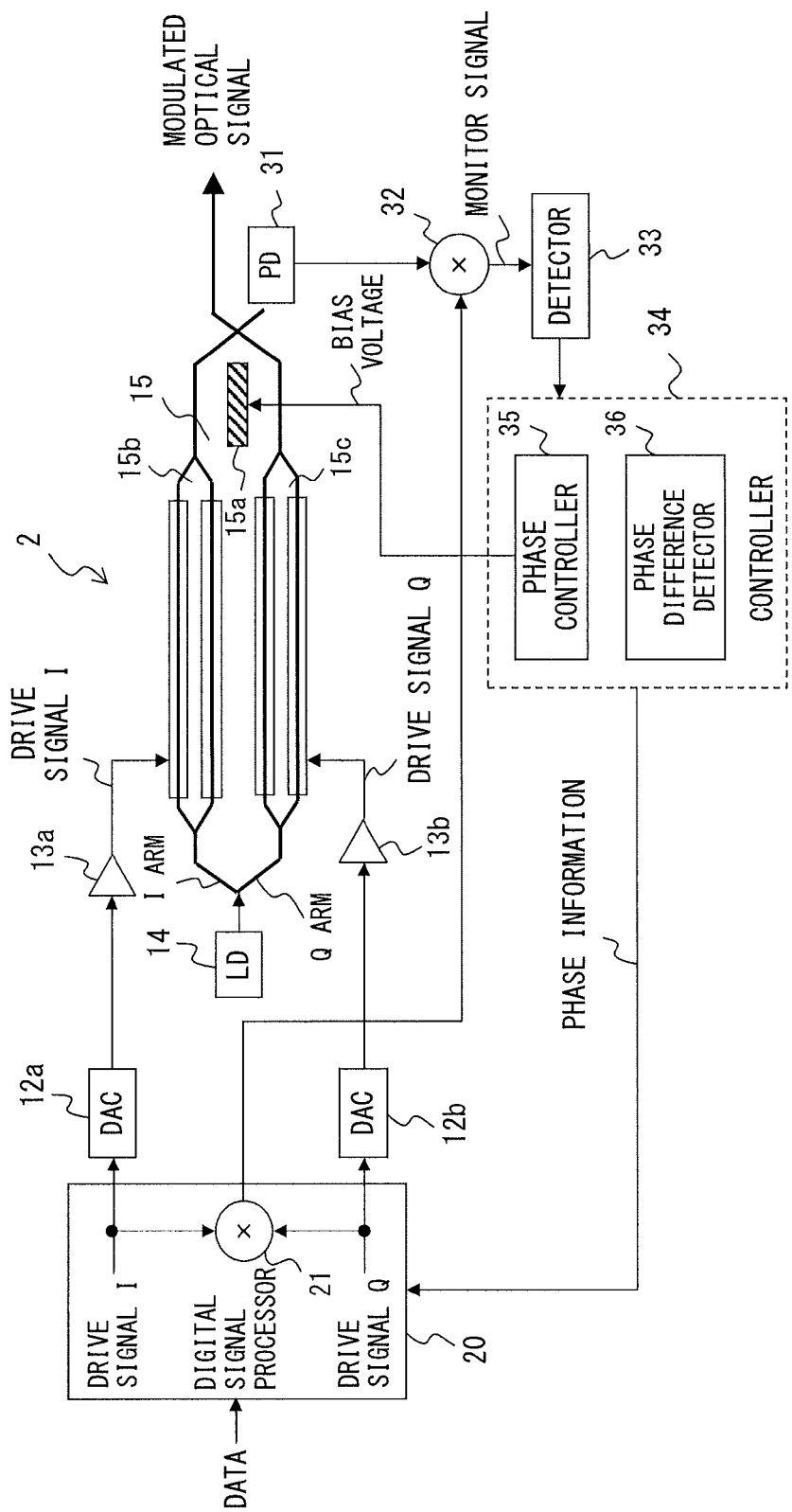
FIG. 2 illustrates a configuration of an optical transmitter according to an embodiment of the present invention.

FIG. 2 illustrates a configuration of an optical transmitter according to an embodiment of the present invention. An optical transmitter 2 of the embodiment illustrated in FIG. 2 includes a digital signal processor 20, D/A converters 12a and 12b, drivers 13a and 13b, a light source 14, an optical modulator 15, a photo detector 31, a multiplier 32, a detector 33, and a controller 34. Note that the optical transmitter 2 may include other unillustrated components.

The digital signal processor 20 generates a drive signal I and a drive signal Q from input data. More specifically, the digital signal processor 20 generates the drive signal I and the drive signal Q by mapping the input data to a constellation for each symbol according to a specified modulation format. In addition, the digital signal processor 20 can generate the drive signal I and the drive signal Q so that an optical signal transmitted by the optical transmitter 2 has a desired characteristic. As an example, the drive signal I and the drive signal Q are generated so that the optical signal has a specified chromatic dispersion. In this case, the drive signal I and the drive signal Q are generated, for example, so as to provide dispersion pre-equalization for compensating for the chromatic dispersion in an optical transmission line. Note that the digital signal processor 20 is implemented, for example, by a processor system including a processor element and a memory. Alternatively, the digital signal processor 20 may be implemented by a hardware circuit. Further alternatively, the digital signal processor 20 may be implemented by a combination of a processor system and a hardware circuit.

The D/A converters 12a and 12b convert the drive signal I and the drive signal Q generated by the digital signal processor 20 to respective analog signals. The drivers 13a and 13b drive the optical modulator 15 with the drive signal I and the drive signal Q respectively outputted from the D/A converters 12a and 12b. The light source 14 generates continuous wave light. The light source 14 is implemented, for example, by a laser diode for generating a laser beam with a specified frequency.

The optical modulator 15 includes a phase shifter 15a, an I arm modulation unit 15b, and a Q arm modulation unit 15c. The continuous wave light generated by the light source 14 is split by an optical splitter and guided to the I arm and the Q arm. The phase shifter 15a is implemented, for example, by an electrode formed near one of the I arm and the Q arm. For example, the phase shifter 15a is assumed to be an electrode formed near the Q arm. In this case, the refractive index of the Q arm is changed and the optical path length of the Q arm is adjusted by controlling the bias voltage supplied to the phase shifter 15a. More specifically, the phase difference between light propagating through the I arm and light propagating through the Q arm (that is, "I-Q phase difference" or "the phase of the phase shifter 15a") is adjusted by controlling the bias voltage supplied to the phase shifter 15a.

The I arm modulation unit 15b and the Q arm modulation unit 15c are formed in the I arm and the Q arm, respectively. The I arm modulation unit 15b modulates the continuous wave light in response to the drive signal I to generate an optical signal. Likewise, the Q arm modulation unit 15c modulates the continuous wave light in response to the drive signal Q to generate an optical signal. The I arm modulation unit 15b and the Q arm modulation unit 15c are respectively implemented, for example, by Mach-Zehnder interferometers. Then, the optical modulator 15 combines the optical signal generated by the I arm modulation unit 15b and the optical signal generated by the Q arm modulation unit 15c to generate a modulated optical signal. The two optical signals are combined, for example, by a 2×2 optical coupler.

The multiplier 21 multiplies the drive signal I and the drive signal Q. In this example, the multiplier 21 is implemented in the digital signal processor 20, but the multiplier 21 may be implemented outside the digital signal processor 20. Also in this example, the multiplier 21 multiplies the drive signal I and the drive signal Q in a digital domain, but may multiply the drive signal I and the drive signal Q in an analog domain. Further, the multiplier 21 may be configured to multiply the drive signals I and Q filtered by a low pass filter.

The photo detector 31 converts the modulated optical signal generated by the optical modulator 15 to an electrical signal. Accordingly, an output signal of the photo detector 31 represents the modulated optical signal generated by the optical modulator 15. Note that the photo detector 31 may be implemented in the optical modulator 15 or may be implemented outside the optical modulator 15.

The multiplier 32 multiplies the output signal of the photo detector 31 and the output signal of the multiplier 21. That is to say, the multiplier 21 and the multiplier 32 multiply the drive signal I, the drive signal Q, and the electrical signal representing the modulated optical signal generated by the optical modulator 15. In the following description, the output signal of the multiplier 32 may be referred to as a "monitor signal". Note that the multiplier 32 may be implemented in the digital signal processor 20. Note also that a low pass filter may be provided between the photo detector 31 and the multiplier 32. In addition, the multiplier 21 and the multiplier 32 are an example of a multiplier circuit to generate a monitor signal.

The detector 33 averages the monitor signal outputted from the multiplier 32 to detect an average value of the monitor signal. The monitor signal is averaged, for example, using a low pass filter. Note that a cutoff frequency of the low pass filter is assumed to be sufficiently lower than a symbol rate of the modulated optical signal. Note also that the detector 33 can detect a sign of the average value of the monitor signal. In this case, the detector 33 outputs monitor sign information representing whether the average value of the monitor signal is a positive value or a negative value.

The controller 34 includes a phase controller 35 and a phase difference detector 36. The controller 34 is implemented, for example, by a processor system including a processor element and a memory. Alternatively, the controller 34 may be implemented by a hardware circuit. Still alternatively, the controller 34 may be implemented by a combination of a processor system and a hardware circuit.

The phase controller 35 controls the I-Q phase difference of the optical modulator 15 by controlling the bias voltage to be supplied to the phase shifter 15a. At this time, the phase controller 35 controls the I-Q phase difference to be a specified value. In this embodiment, the "specified value" is $\pi/2+$ 2nπ or 3π/2+2nπ. More specifically, the phase controller 35 controls the bias voltage supplied to the phase shifter 15*a* so that the I-Q phase difference is adjusted to be π/2+2nπ or 3π/2+2nπ. The method of controlling the I-Q phase difference to be π/2+2nπ or 3π/2+2nπ is not particularly limited, but a well-known technique can be used. For example, the phase controller 35 may control the I-Q phase difference to be π/2+2nπ or 3π/2+2nπ by a method described in Japanese Laid-Open Patent Publication No. 2007-82094, Japanese Laid-Open Patent Publication No. 2009-246578, and Japanese Laid-Open Patent Publication No. 2007-259426.

The phase difference detector 36 detects the I-Q phase difference of the optical modulator 15 using a detection result by the detector 33. More specifically, the phase difference detector 36 detects the I-Q phase difference based on the average value of a product of the drive signal I, the drive signal Q, and the monitor signal representing the output modulated optical signal, or the sign of the average value thereof. Here, the I-Q phase difference is controlled by the phase controller 35 to be π/2+2nπ or 3π/2+2nπ. Thus, the phase difference detector 36 may decide whether the I-Q phase difference is either π/2+2nπ or 3π/2+2nπ.

The controller 34 notifies the digital signal processor 20 of the phase information representing the I-Q phase difference detected by the phase difference detector 36. By so doing, the digital signal processor 20 generates (or corrects) the drive signal I and the drive signal Q based on the phase information. More specifically, the digital signal processor 20 generates (or corrects) the drive signal I and the drive signal Q based on whether the I-Q phase difference is either π/2+2nπ or 3π/2+2nπ". Thus, the optical transmitter 2 can generate the modulated optical signal appropriate for the I-Q phase difference of the optical modulator 15. In other words, the optical transmitter 2 may generate substantially the same modulated optical signal regardless whether the I-Q phase difference is controlled to be either π/2+2nπ or 3π/2+2nπ.

Figure 3A:
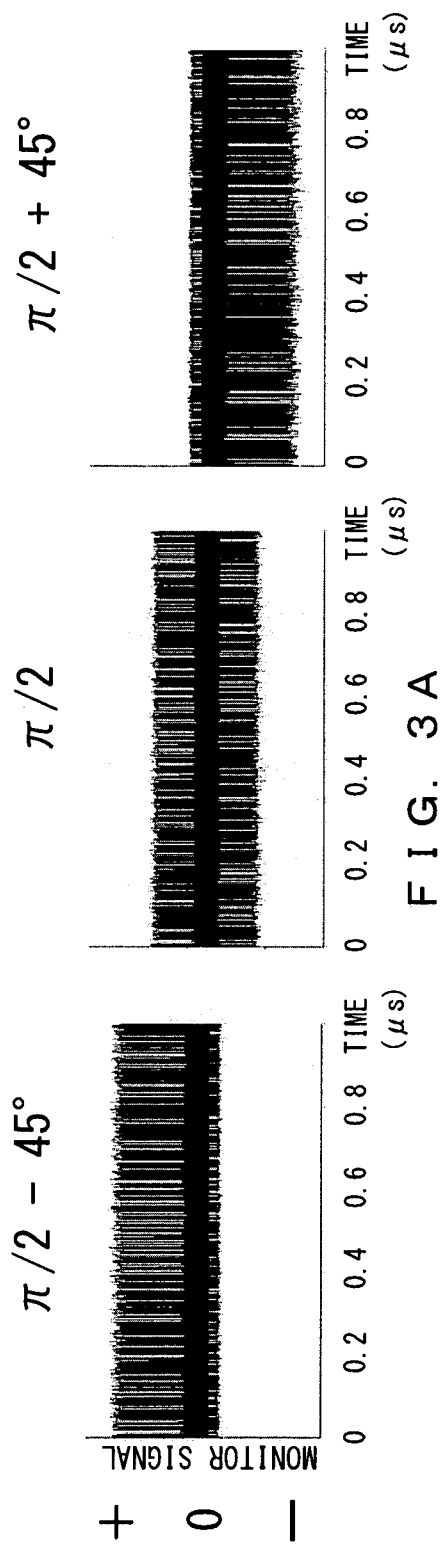
FIGS. 3A and 3B illustrate a change in monitor signal with respect to an I-Q phase difference.
Figure 3B:
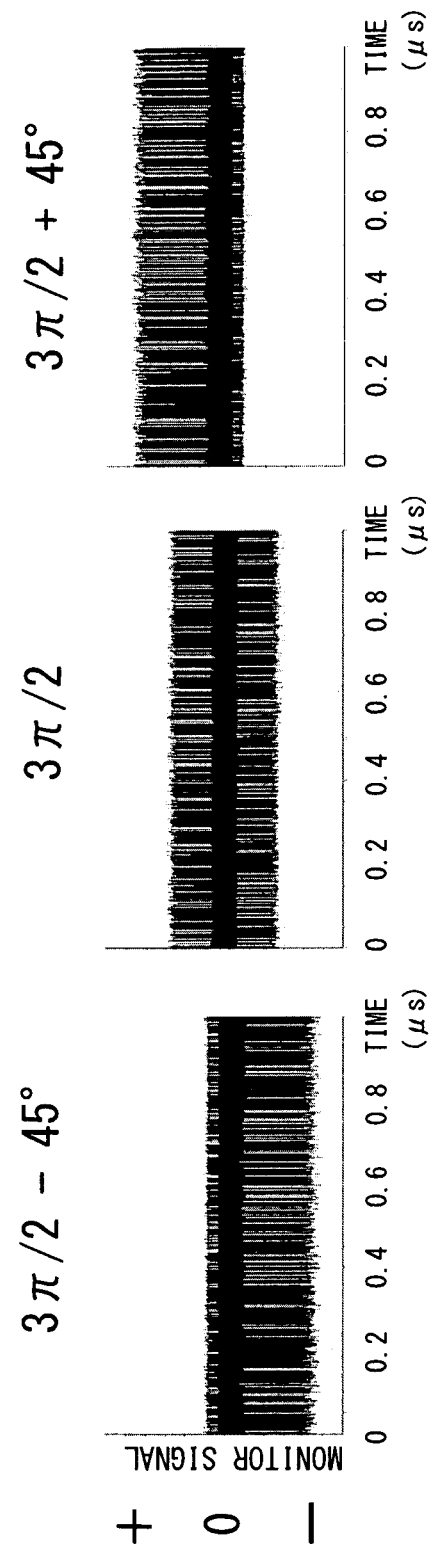

FIGS. 3A and 3B illustrate a change in the monitor signal with respect to the I-Q phase difference of the optical modulator 15. The modulation format is 16-QAM. Note that in the following description, π/2+2nπ may be referred to simply as π/2, and 3π/2+2nπ may be referred to simply as 3π/2.

FIG. 3A illustrates the monitor signal when the I-Q phase difference is controlled to be π/2 or around π/2. When the I-Q phase difference is controlled to be π/2, the monitor signal is distributed around zero. Thus, when the I-Q phase difference is π/2, an average value of the monitor signal is zero. In other words, when the I-Q phase difference is π/2, zero is detected by the detector 33. Note that "zero" is assumed to include "approximately zero" or "substantially zero".

When the I-Q phase difference is π/2−45 degrees, the monitor signal is distributed on the positive side in this example. Thus, the detector 33 detects a positive value. Meanwhile, when the I-Q phase difference is π/2+45 degrees, the monitor signal is distributed on the negative side in this example. Thus, the detector 33 detects a negative value. Note that in the following description, the sign of a value detected by the detector 33 may be referred to as a "monitor sign". For example, when the detector 33 detects the positive value, the monitor sign is "positive"; and when the detector 33 detects the negative value, the monitor sign is "negative".

FIG. 3B illustrates the monitor signal when the I-Q phase difference is controlled to be 3π/2 or around 3π/2. When the I-Q phase difference is controlled to be 3π/2, the monitor signal is distributed around zero in the same manner as when the I-Q phase difference is π/2. Thus, the detector 33 also detects zero when the I-Q phase difference is 3π/2.

When the I-Q phase difference is 3π/2−45 degrees, the monitor signal is distributed on the negative side in this example. Thus, "negative" is detected as the monitor sign. Meanwhile, when the I-Q phase difference is 3π/2+45 degrees, the monitor signal is distributed on the positive side in this example. Thus, the monitor sign is "positive".

As described above, when the I-Q phase difference is π/2 or 3π/2, the detector 33 detects zero. Thus, in order to adjust the I-Q phase difference to be π/2 or 3π/2, the phase controller 35 may control the bias voltage supplied to the phase shifter 15*a* so that the detector 33 detects zero. Alternatively, the phase controller 35 may control the bias voltage so that the average value detected by the detector 33 approaches zero.

Also in this embodiment, as illustrated in FIG. 3A, when the I-Q phase difference increases from π/2−45 degrees to π/2+45 degrees, the monitor sign changes from "positive" to "negative". Meanwhile, as illustrated in FIG. 3B, when the I-Q phase difference increases from 3π/2−45 degrees to 3π/2+45 degrees, the monitor sign changes from "negative" to "positive". In other words, the direction of changing the monitor sign when the I-Q phase difference is π/2 is opposite to the direction of changing the monitor sign when the I-Q phase difference is 3π/2. Accordingly, the phase difference detector 36 may decide whether the I-Q phase difference is controlled to be either π/2 or 3π/2 using the change in the monitor sign.

Figure 4:
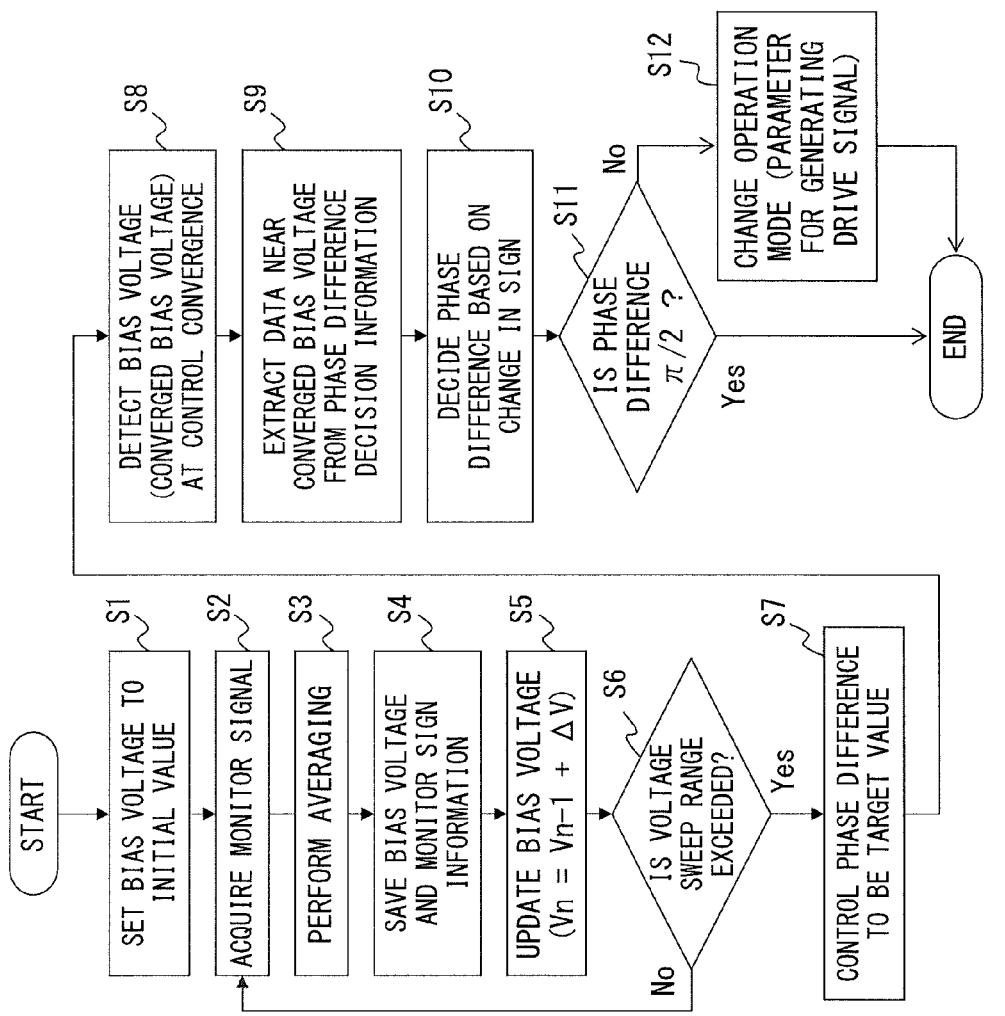
FIG. 4 is a flowchart illustrating a first method of controlling an operation mode of the optical transmitter.

FIG. 4 is a flowchart illustrating a first method of controlling an operation mode of the optical transmitter. The process of this flowchart is executed, for example, before the optical transmitter 2 starts a communication service or when the optical transmitter 2 is in maintenance. Note that when the process of this flowchart is executed, the digital signal processor 20 generates the drive signal I and the drive signal Q. Here, the optical transmitter 2 generates the modulated optical signal by mapping the input data to a corresponding signal point for each symbol in a multi-level modulation format. Note that the distribution of symbols to be mapped to each of the signal points (for example, four signal points for the QPSK and 16 signal points for the 16QAM) is assumed to be uniform or nearly uniform.

When the process of this flowchart starts, the operation mode of the optical transmitter 2 (or the parameter for generating the drive signal from the input data) is set assuming that the I-Q phase difference of the optical modulator 15 is π/2. In other words, the operation mode of the optical transmitter 2 is assumed to be controlled so that the optical modulator 15 generates a specified modulated optical signal when the I-Q phase difference is π/2.

In step S1, the phase controller 35 controls the bias voltage supplied to the phase shifter 15*a* to be an initial value. The initial value is not particularly limited, but, for example, is near zero volt.

In step S2, the detector 33 acquires the monitor signal outputted from the multiplier 32. Note that the monitor signal is generated by multiplying the drive signal I, the drive signal Q, and the electrical signal representing the output modulated optical signal as described above. In step S3, the detector 33 averages the monitor signal. Then, the detector 33 outputs the monitor sign information representing whether the average value of the monitor signal is a positive value or a negative value.

In step S4, the phase difference detector 36 saves the monitor sign information acquired in S3 associated with the current bias voltage. In step S5, the phase controller 35 updates the bias voltage to be supplied to the phase shifter 15*a*. At this time, a new bias voltage Vn is calculated by the following expression. Note that the $V_{n-1}$ represents the current bias voltage. $\Delta V$ is a specified constant.

$$V_n = V_{n-1} + \Delta V$$

In step S6, the phase controller 36 decides whether the new bias voltage Vn exceeds the voltage sweep range. The voltage sweep range is determined, for example, based on a change in voltage causing the I-Q phase difference to shift by $2\pi$. For example, the voltage sweep range is determined so that the I-Q phase difference shifts by $2\pi$ or more when the bias voltage changes from a minimum value to a maximum value of the voltage sweep range.

If the bias voltage Vn does not exceed the voltage sweep range, the process of the optical transmitter 2 returns to step S2. In other words, steps S2-S6 are executed repeatedly until the bias voltage Vn exceeds the voltage sweep range. The operation of repeatedly executing steps S2-S6 corresponds to the process of collecting the monitor sign information while sweeping the bias voltage.

FIG. 5 illustrates an example of the phase difference decision information generated in steps S2-S6. The phase difference decision information represents the sign of the average value of the monitor signal with respect to the bias voltage. In this embodiment, when the bias voltage increases from zero to 2 volts, the monitor sign changes from positive to negative. Then, when the bias voltage increases from 4 volts to 6 volts, the monitor sign changes from negative to positive. Further, when the bias voltage increases from 8 volts to 10 volts, the monitor sign changes from positive to negative. Note that in this embodiment, $\Delta V=1$ volt.

In step S7, the phase controller 35 controls the I-Q phase difference of the optical modulator 15 to be a target value. The target value of the I-Q phase difference is $\pi/2$. The method of controlling the I-Q phase difference to be the target value is not particularly limited. For example, the phase controller 35 may control the I-Q phase difference to be the target value by a method described in Japanese Laid-Open Patent Publication No. 2007-82094, Japanese Laid-Open Patent Publication No. 2009-246578, and Japanese Laid-Open Patent Publication No. 2007-259426. As an example, the phase controller 35 adjusts the I-Q phase difference to be the target value by controlling the bias voltage so that the average value of the monitor signal outputted from the multiplier 33 approaches zero (or to be zero). However, this method controls the I-Q phase difference to be either $\pi/2$ or $3\pi/2$. Accordingly, the phase difference detector 36 decides whether the I-Q phase difference is controlled to be either $\pi/2$ or $3\pi/2$.

In step S8, the phase difference detector 36 detects the bias voltage when the I-Q phase difference converges to the target value. In other words, the phase difference detector 36 detects the bias voltage when the process of step S7 completes. In the following description, the bias voltage detected in step S8 may be referred to as a "converged bias voltage".

In step S9, the phase difference detector 36 extracts data corresponding to the bias voltage near the converged bias voltage from the phase difference decision information. At this time, the phase difference detector 36 extracts multiple sets of data from the phase difference decision information. For example, in steps S2-S6, the phase difference decision information illustrated in FIG. 5 is assumed to be generated. Also in step S7, the bias voltage (that is, the converged bias voltage) when the I-Q phase difference converges to the target value is assumed to be 5.0 volts. Then, the phase difference detector 36 acquires data corresponding to a bias voltage less than the converged bias voltage and data corresponding to a bias voltage greater than the converged bias voltage near the converged bias voltage. As a result, "4.0 volts, negative" and "6.0 volts, positive" are obtained.

In steps S10 and S11, the phase difference detector 36 decides whether the I-Q phase difference is controlled to be either $\pi/2$ or $3\pi/2$ based on the multiple sets of data acquired in step S9. Here, in this embodiment, it is assumed that the more the bias voltage increases, the more the I-Q phase difference increases. In addition, the changes in monitor signal for the I-Q phase difference are assumed to be as illustrated in FIGS. 3A and 3B. In this case, when the monitor sign information changes from "positive" to "negative" as the bias voltage increases, the phase difference detector 36 decides that the I-Q phase difference is controlled to be $\pi/2$. On the contrary, when the monitor sign information changes from "negative" to "positive" as the bias voltage increases, the phase difference detector 36 decides that the I-Q phase difference is controlled to be $3\pi/2$. Then, the controller 34 notifies the digital signal processor 20 of the phase information representing a detection result by the phase difference detector 36.

Note that the decision in steps S8-S11 may be performed with various patterns. For example, when two sets of data are extracted from the phase difference decision information, the decision is performed as follows.
(1) When the sign changes from positive to negative, the I-Q phase difference is $\pi/2$.
(2) When the sign changes from negative to positive, the I-Q phase difference is $3\pi/2$.
(3) When the sign changes from positive to zero, the I-Q phase difference is $\pi/2$.
(4) When the sign changes from negative to zero, the I-Q phase difference is $3\pi/2$.
(5) When the sign changes from zero to negative, the I-Q phase difference is $\pi/2$.
(6) When the sign changes from zero to positive, the I-Q phase difference is $3\pi/2$.

When three sets of data are extracted from the phase difference decision information, the decision is performed as follows.
(1) When the sign sequentially changes from positive to zero and then to negative, the I-Q phase difference is $\pi/2$.
(2) When the sign sequentially changes from negative to zero and then to positive, the I-Q phase difference is $3\pi/2$.

The digital signal processor 20 decides the operation mode of the optical transmitter 2 according to the phase information received from the controller 34. Here, the initial operation mode of the optical transmitter 2 is set to an operation mode corresponding to the I-Q phase difference $\pi/2$ when the process of this flowchart starts. Thus, if the I-Q phase difference is controlled to be $\pi/2$ (S11: Yes), the process of the optical transmitter 2 ends. If the I-Q phase difference is not controlled to be $\pi/2$ (S11: No), the digital signal processor 20 executes the process in step S12.

In step S12, the digital signal processor 20 changes the parameter for generating the drive signal I and the drive signal Q from the input data so as to generate substantially the same modulated optical signal as that when the I-Q phase difference is controlled to be $\pi/2$. Note that the method of changing the parameter based on the phase information will be described in detail later.

As described above, the optical transmitter 2 of the embodiment decides whether the I-Q phase difference of the optical modulator 15 is controlled to be either $\pi/2$ or $3\pi/2$, and then generates the modulated optical signal using a parameter (or an operation mode) according to the decision result. In other words, the optical transmitter 2 can generate substantially the same modulated optical signal regardless of whether the I-Q phase difference is controlled to be either $\pi/2$ or $3\pi/2$. Thus, the use of the optical transmitter 2 of the embodiment in the optical transmission system allows the optical receiver to recover data from the modulated optical signal without switching the demodulation operation according to the settings of the I-Q phase difference of the optical modulator 15. Note that the method of deciding whether the I-Q phase difference is either $\pi/2$ or $3\pi/2$ is not limited to the aforementioned embodiment, but the optical transmitter 2 may detect the I-Q phase difference by another method.

Figure 6:
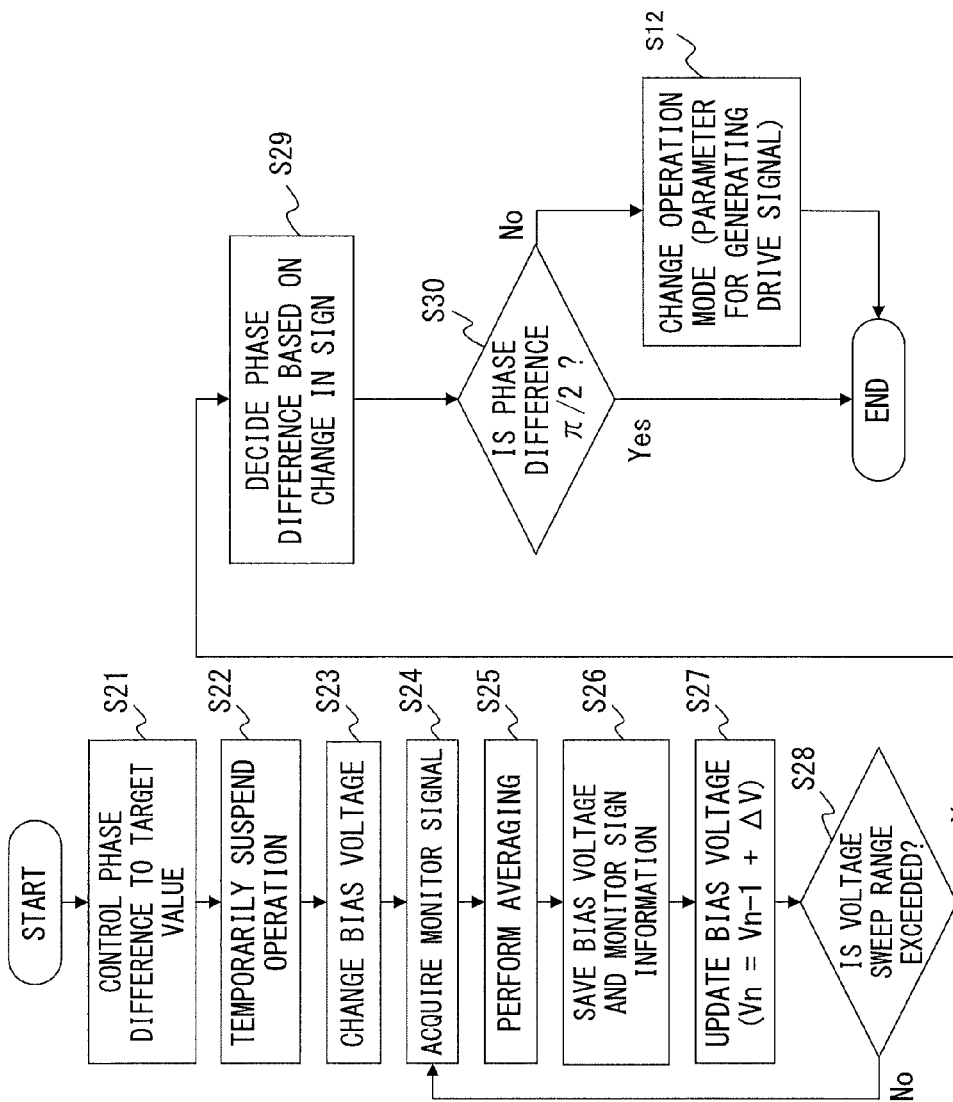
FIG. 6 is a flowchart illustrating a second method of controlling the operation mode of the optical transmitter.

FIG. 6 is a flowchart illustrating a second method of controlling the operation mode of the optical transmitter. The optical transmitter 2 may execute the process of the flowchart illustrated in FIG. 6 instead of the flowchart illustrated in FIG. 4.

In step S21, the phase controller 35 controls the I-Q phase difference of the optical modulator 15 to be a specified target value. This process is substantially the same as that in step S11 of FIG. 4. Thus, the I-Q phase difference is controlled to be either $\pi/2$ or $3\pi/2$. Note that in the description of the flowchart of FIG. 6, the bias voltage when the I-Q phase difference converges to $\pi/2$ or $3\pi/2$ is also assumed to be referred to as a "converged bias voltage".

In step S22, the optical transmitter 2 temporarily suspends the operation. In step S23, the phase controller 35 changes the bias voltage. At this time, the phase controller 35 determines a new bias voltage, for example, by reducing the current bias voltage (that is, the converged bias voltage) by a specified value.

Steps S24-S28 are substantially the same as steps S2-S6 of FIG. 4. More specifically, the controller 34 generates the phase difference decision information illustrated in FIG. 5 by sweeping the bias voltage. Note that in the method illustrated in FIG. 6, the converged bias voltage has already been detected when steps S24-S28 are executed. Thus, the controller 34 may generate the phase difference decision information only in a region near the converged bias voltage. In this case, the voltage sweep range in step S28 is narrower than the voltage sweep range in step S6 of FIG. 4. Thus, the time required to generate the phase difference decision information by the method illustrated in FIG. 6 may be shorter than that by the method illustrated in FIG. 4.

Note that the controller 34 may not sweep the bias voltage in steps S24-S28. For example, the controller 34 may only acquire the monitor sign information for "converged bias voltage−ΔV" and "converged bias voltage+ΔV".

Steps S29 and S30 are substantially the same as steps S10 and S11 of FIG. 4. More specifically, the phase difference detector 36 decides whether the I-Q phase difference is controlled to be either $\pi/2$ or $3\pi/2$ based on the phase difference decision information generated in steps S24-S28. Then, the digital signal processor 20 decides the operation mode of the optical transmitter 2 according to the phase information received from the controller 34. More specifically, if the I-Q phase difference is controlled to be $\pi/2$ (S30: Yes), the process of the optical transmitter 2 ends. If the I-Q phase difference is not controlled to be $\pi/2$ (S30: No), the digital signal processor 20 executes the process in step S12.

Figure 7:
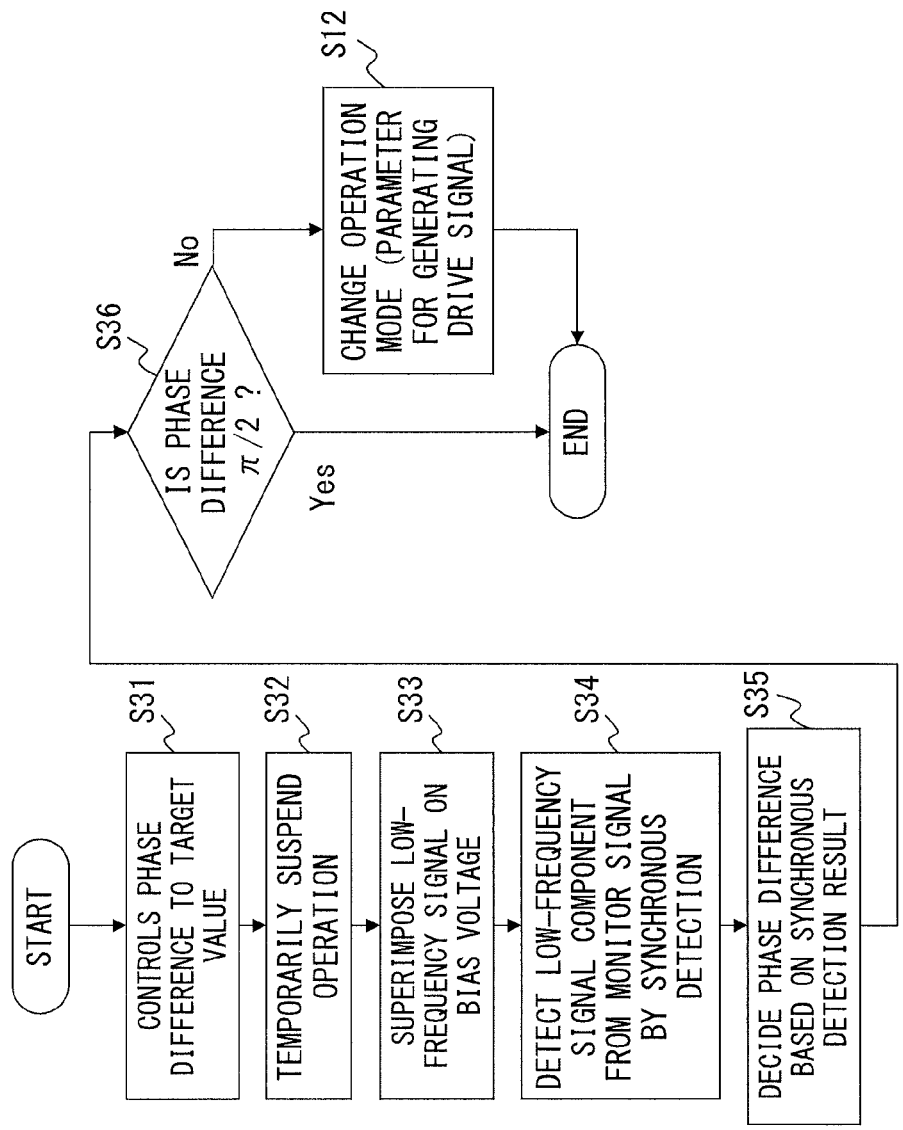
FIG. 7 is a flowchart illustrating a third method of controlling the operation mode of the optical transmitter.

FIG. 7 is a flowchart illustrating a third method of controlling the operation mode of the optical transmitter. The optical transmitter 2 may execute the process of the flowchart illustrated in FIG. 7 instead of the flowchart illustrated in FIG. 4.

Steps S31 and S32 are substantially the same as steps S21 and S22 of FIG. 6. More specifically, the I-Q phase difference is controlled to be either $\pi/2$ or $3\pi/2$. Note that in the description of the flowchart of FIG. 7, the bias voltage when the I-Q phase difference converges to $\pi/2$ or $3\pi/2$ is also assumed to be referred to as a "converged bias voltage".

In step S33, the phase controller 35 superimposes a low-frequency signal on the converged bias voltage. The frequency of the low-frequency signal is assumed to be sufficiently lower than the data rate or symbol rate. Note that in this embodiment, the optical transmitter 2 includes a low-frequency signal generation circuit for generating a low-frequency signal and the phase controller 35 is assumed to include a circuit for superimposing the low-frequency signal on the bias voltage.

In step S34, the detector 33 detects a low-frequency signal component from the monitor signal by synchronous detection. The synchronous detection is implemented, for example, by multiplying the aforementioned low-frequency signal by the monitor signal. In this embodiment, the detector 33 is assumed to have a circuit for multiplying the monitor signal by the low-frequency signal generated by the aforementioned low-frequency signal generation circuit.

In steps S35 and S36, the phase difference detector 36 detects the I-Q phase difference based on the synchronous detection result. More specifically, if the low-frequency signal component detected from the monitor signal is in-phase with the low-frequency signal generated by the low-frequency signal generation circuit, the phase difference detector 36 decides that the I-Q phase difference is one of $\pi/2$ and $3\pi/2$ (for example, $\pi/2$). Meanwhile, if the low-frequency signal component detected from the monitor signal is reverse phase with the low-frequency signal generated by the low-frequency signal generation circuit, the phase difference detector 36 decides that the I-Q phase difference is the other one of $\pi/2$ and $3\pi/2$ (for example, $3\pi/2$).

The digital signal processor 20 decides the operation mode of the optical transmitter 2 according to the phase information received from the controller 34 in the same procedure as illustrated in FIG. 4 or FIG. 6. More specifically, if the I-Q phase difference is controlled to be $\pi/2$ (S36: Yes), the process of the optical transmitter 2 ends. Meanwhile, if the I-Q phase difference is not controlled to be $\pi/2$ (S36: No), the digital signal processor 20 executes the process in step S12.

Note that if the optical transmitter is configured such that a low-frequency signal is always superimposed on the bias voltage, steps S32 and S33 of FIG. 7 may not be executed. In this case, the amplitude of the low-frequency signal may be changed when the control of the flowchart illustrated in FIG. 7 is executed.

Accordingly, the optical transmitter 2 can decide whether the I-Q phase difference is controlled to be either $\pi/2$ or $3\pi/2$. Then, the digital signal processor 20 sets the operation mode (that is, the parameter for generating the drive signal I and the drive signal Q from the input data) according to the decision result.

Figure 8:
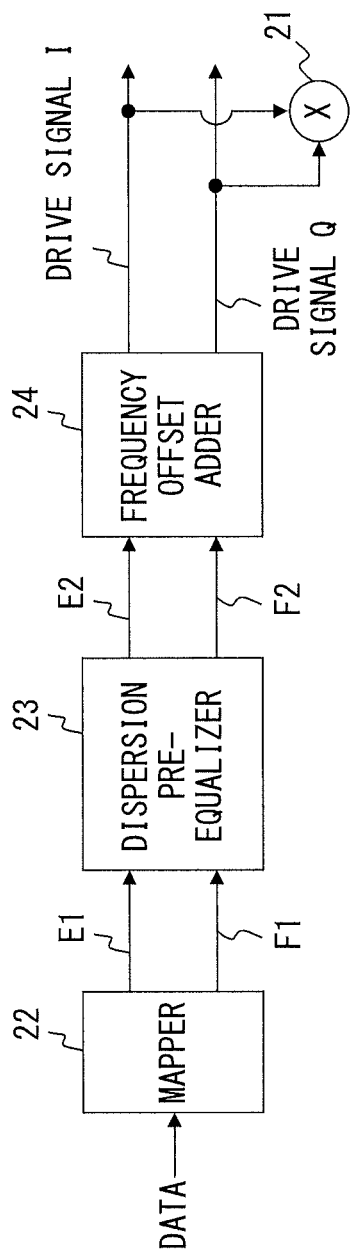
FIG. 8 is a block diagram describing functions of a digital signal processor.

FIG. 8 is a block diagram describing functions of the digital signal processor 20. The digital signal processor 20 includes a mapper 22, a dispersion pre-equalizer 23, and a frequency offset adder 24. In this example, it is assumed that the multiplier 21 is implemented in the digital signal processor 20 and multiplies the drive signal I and the drive signal Q in a digital domain.

Note that in the example illustrated in FIG. 8, the frequency offset adder 24 is located on the output side of the dispersion pre-equalizer 23, but the frequency offset adder 24 may be located on the input side of the dispersion pre-equalizer 23. Note also that the digital signal processor 20 may include other functions. Note further that the digital signal processor 20 may not have the dispersion pre-equalizer 23 and may not have the frequency offset adder 24.

The mapper 22 maps the input data to a corresponding signal point for each symbol according to the specified modulation format. For example, in the QPSK or DQPSK, one symbol is generated every two bits. In the 16QAM, one symbol is generated every four bits.

Figure 9:
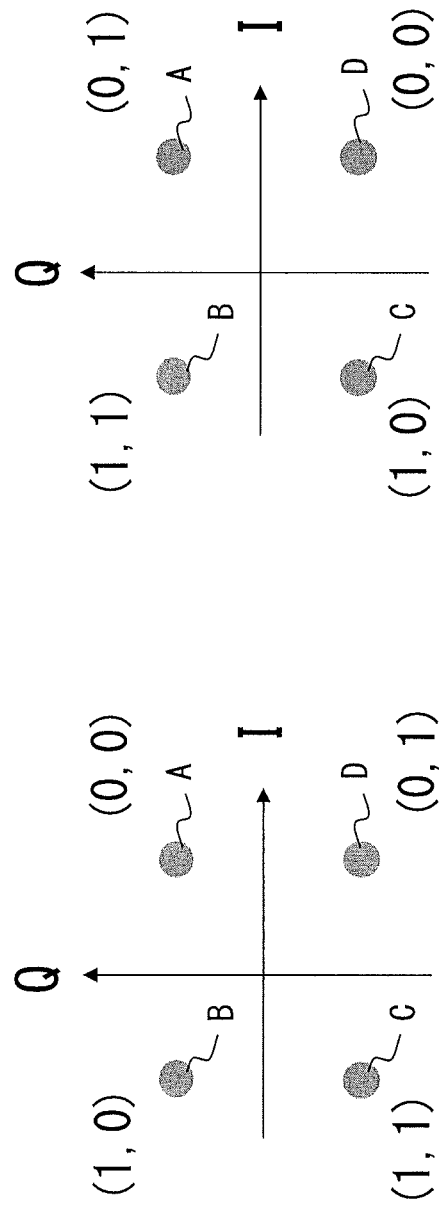
FIGS. 9A and 9B illustrate examples of a QPSK constellation.

FIGS. 9A and 9B illustrate examples of a QPSK constellation. In this example, when the I-Q phase difference of the optical modulator 15 is controlled to be the target value (that is, $\pi/2$), mapping illustrated in FIG. 9A is performed. More specifically, data "00" is mapped to signal point A. Likewise, data "10", "11", and "01" is mapped to signal points B, C, and D respectively. Thus, in response to data "00", "10", "11", and "01", the mapper 22 outputs a set of signals E1 and F1 respectively according to the following mapping pattern 1.

Data "00": (E1, F1)=(+1, +1)
Data "10": (E1, F1)=(−1, +1)
Data "11": (E1, F1)=(−1, −1)
Data "01": (E1, F1)=(+1, −1) . . . Mapping pattern 1

Note that there is a possibility that the I-Q phase difference of the optical modulator 15 may be controlled to be not $\pi/2$ but $3\pi/2$ as described above. If the input data is mapped according to the mapping pattern 1 when the I-Q phase difference is $3\pi/2$, the modulated optical signal generated by the optical modulator 15 is different from the modulated optical signal generated when the I-Q phase difference is $\pi/2$. More specifically, if the input data is mapped according to the mapping pattern 1 when the I-Q phase difference is $3\pi/2$, the modulated optical signal corresponding to the constellation illustrated in FIG. 9B is generated.

Here, when FIG. 9A is compared with FIG. 9B, the constellation illustrated in FIG. 9A is obtained by mirror-reversing the constellation illustrated in FIG. 9B around the I axis. Thus, when the I-Q phase difference is $3\pi/2$, the same modulated optical signal as the modulated optical signal generated when the I-Q phase difference is $\pi/2$ is generated by mapping the input data to a corresponding signal point according to the following mapping pattern 2.

Data "00": (E1, F1)=(+1, −1)
Data "10": (E1, F1)=(−1, −1)
Data "11": (E1, F1)=(−1, +1)
Data "01": (E1, F1)=(+1, +1) . . . Mapping pattern 2

The mapper 22 selects a mapping pattern according to the phase information notified from the controller 34. More specifically, if the phase information represents the I-Q phase difference $\pi/2$, the mapper 22 maps the input data to a corresponding signal point for each symbol according to the mapping pattern 1. Meanwhile, if the phase information represents the I-Q phase difference $3\pi/2$, the mapper 22 maps the input data to a corresponding signal point for each symbol according to the mapping pattern 2. In this case, even if the I-Q phase difference of the optical modulator 15 is $3\pi/2$, the digital signal processing generates the same modulated optical signal as that when the I-Q phase difference of the optical modulator 15 is controlled to be $\pi/2$. In other words, the optical modulator 15 can generate substantially the same modulated optical signal regardless of whether the I-Q phase difference is controlled to be either $\pi/2$ or $3\pi/2$.

Note that in this embodiment, "$\pi/2$" is an expected I-Q phase difference. Thus, if the I-Q phase difference detected by the phase difference detector 36 matches the expected I-Q phase difference, the digital signal processor 20 maps the input data according to the mapping pattern 1. In contrast to this, if the I-Q phase difference detected by the phase difference detector 36 does not match the expected I-Q phase difference, the digital signal processor 20 maps the input data according to the mapping pattern 2. As a result, even if the I-Q phase difference of the optical modulator 15 is not controlled to be the expected value, the optical transmitter 2 generates the modulated optical signal as if the I-Q phase difference is controlled to be the expected value.

Figure 10:
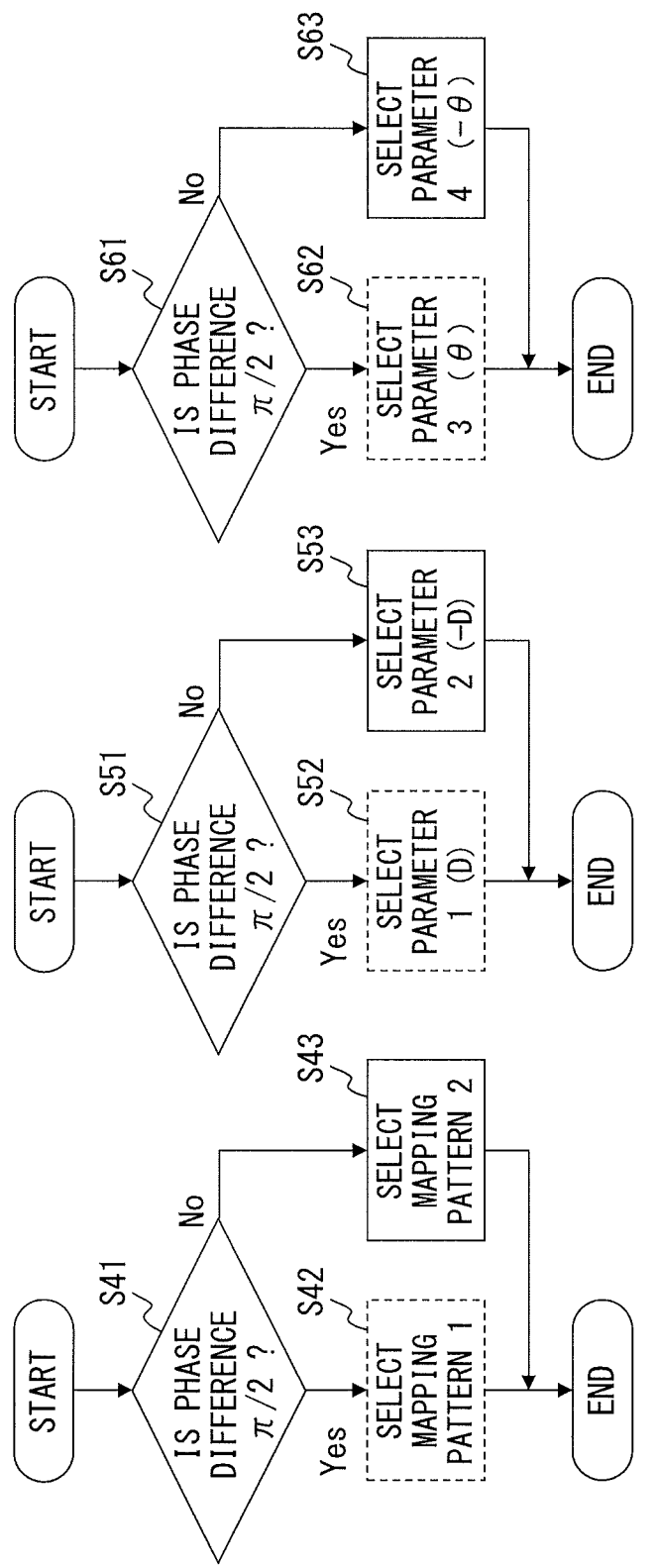
FIGS. 10A-10C are flowcharts illustrating methods of controlling the operation mode according to the I-Q phase difference.

FIG. 10A is a flowchart illustrating a process of setting the operation mode of the mapper 22. The process of the flowchart is executed by the digital signal processor 20 when the phase information representing the I-Q phase difference is generated by the method illustrated in FIG. 4, FIG. 6, or FIG. 7.

In step S41, the digital signal processor 20 acquires the phase information from the controller 34 and detects whether the I-Q phase difference is $\pi/2$ or not. If the I-Q phase difference is $\pi/2$, the process moves to step S42, in which the digital signal processor 20 sets the operation mode or the operation parameter of the mapper 22 so as to map the input data to a corresponding signal point for each symbol according to the mapping pattern 1. Meanwhile, if the I-Q phase difference is $3\pi/2$, the process moves to step S43, in which the digital signal processor 20 sets the operation mode or the operation parameter of the mapper 22 so as to map the input data to a corresponding signal point for each symbol according to the mapping pattern 2. The process of step S43 is an example of the process of step S12 illustrated in FIG. 4, FIG. 6, or FIG. 7.

In the example illustrated in FIG. 4, FIG. 6, or FIG. 7, the mapper 22 is configured to select the mapping pattern 1 when the flowchart starts. Thus, if the I-Q phase difference is $\pi/2$ (S41: Yes), the digital signal processor 20 may not execute the process of step S42. Meanwhile, if the I-Q phase difference is $3\pi/2$ (S41: No), the process moves to step S43, in which the digital signal processor 20 controls the mapper 22 so as to select the mapping pattern 2.

The dispersion pre-equalizer 23 corrects the signals E1 and F1 outputted from the mapper 22 so as to add a specified chromatic dispersion to the modulated optical signal transmitted from the optical transmitter 2. Here, the "specified chromatic dispersion" is determined, for example, so as to compensate for a chromatic dispersion of an optical transmission line between the optical transmitter 2 and the optical receiver. In this case, it is preferable that the chromatic dispersion of the optical transmission line is measured in advance.

The dispersion pre-equalizer 23 can add desired chromatic dispersion to the modulated optical signal, for example, by generating the signals E2 and F2 by multiplying the signals E1 and F1 by matrix D. The matrix D is, for example, an inverse matrix of a matrix representing the chromatic dispersion of the optical transmission line between the optical transmitter 2 and the optical receiver.

FIG. 10B is a flowchart illustrating a process of setting the operation mode of the dispersion pre-equalizer 23. The process of the flowchart is executed by the digital signal processor 20 when the phase information representing the I-Q phase difference is generated by the method illustrated in FIG. 4, FIG. 6, or FIG. 7.

In step S51, the digital signal processor 20 acquires the phase information from the controller 34 and detects whether the I-Q phase difference is $\pi/2$ or not. If the I-Q phase difference is $\pi/2$, the process moves to step S52, in which the digital signal processor 20 supplies parameter 1 to the dispersion pre-equalizer 23 so as to perform pre-equalization for compensating for the chromatic dispersion of the optical transmission line. The parameter 1 represents a chromatic dispersion for compensating for the chromatic dispersion of the optical transmission line and is supplied to the dispersion pre-equalizer 23 as an element of the aforementioned matrix D.

If the I-Q phase difference is 3π/2, the process moves to step S53, in which the digital signal processor 20 sets parameter 2 to the dispersion pre-equalizer 23. The parameter 2 is obtained by reversing the sign of the parameter 1. For example, when the parameter 1 represents "500 ps/nm", the parameter 2 represents "−500 ps/nm".

The frequency offset adder 24 corrects the signals E2 and F2 so as to compensate for the difference between a frequency of the light source 14 of the optical transmitter 2 and a frequency of local oscillation light used by the optical coherent receiver to receive the optical signal. The signals E2 and F2 represent signals inputted to the frequency offset adder 24 and are outputted from the dispersion pre-equalizer 23 in the example illustrated in FIG. 8.

The correction for supplying a frequency offset to the optical signal is implemented by the following rotation calculation. Note that I and Q indicate output signals of the frequency offset adder 24. θ(t) indicates an angle corresponding to the frequency offset added to the optical signal.

$$I = E2 \cos\theta(t) - F2 \sin\theta(t)$$

$$Q = E2 \sin\theta(t) + F2 \cos\theta(t)$$

FIG. 10C is a flowchart illustrating a process of setting the operation mode of the frequency offset adder 24. The process of the flowchart is executed by the digital signal processor 20 when the phase information representing the I-Q phase difference is generated by the method illustrated in FIG. 4, FIG. 6, or FIG. 7.

In step S61, the digital signal processor 20 acquires the phase information from the controller 34 and detects whether the I-Q phase difference is π/2 or not. If the I-Q phase difference is π/2, the process moves to step S62, in which the digital signal processor 20 supplies the parameter 3 to the frequency offset adder 24 so as to compensate for the frequency offset between the optical transmitter 2 and the optical receiver. The parameter 3 is represented by θ of the aforementioned rotation calculation.

If the I-Q phase difference is 3π/2, the process moves to step S63, in which the digital signal processor 20 sets the parameter 4 to the frequency offset adder 24. The parameter 4 is obtained by reversing the sign of the parameter 3. More specifically, if the parameter 3 is "θ", the parameter 4 is "−θ".

As described above, in the optical transmitter 2 of the present embodiment, the I-Q phase difference of the optical modulator 15 is controlled to be either π/2 or 3π/2. Thus, the optical transmitter 2 decides whether the I-Q phase difference of the optical modulator 15 is controlled to be either π/2 or 3π/2, and then generates the modulated optical signal using a parameter (or an operation mode) according to the decided result. In other words, the optical transmitter 2 can generate substantially the same modulated optical signal regardless of whether the I-Q phase difference is controlled to be either π/2 or 3π/2. Accordingly, the optical receiver need not execute the process of detecting the I-Q phase difference when data is recovered from the modulated optical signal. This results in reducing the processing amount of the optical receiver. Particularly in the multi-level modulation with a large number of bits per symbol, power consumption of the optical receiver is reduced.

In addition, the optical transmitter of the present embodiment can provide a desired dispersion pre-equalization and/or a desired frequency offset regardless of whether the I-Q phase difference is controlled to be either π/2 or 3π/2. This improves the characteristics of the modulated optical signal or suppresses the deterioration of the characteristics of the modulated optical signal.

Note that in the aforementioned embodiment, if the I-Q phase difference is controlled to be 3π/2, the digital signal processor 20 generates the same optical signal as that when the I-Q phase difference is controlled to be π/2, by changing the parameter for generating the drive signal. In other words, if the I-Q phase difference is controlled to be 3π/2, the digital signal processing provides a state equivalent to that when the I-Q phase difference is controlled to be π/2. However, the present invention is not limited to this configuration. For example, when the I-Q phase difference is controlled to be 3π/2, the optical transmitter according to the present invention may adjust the I-Q phase difference to be π/2 by controlling the bias voltage. In this case, the phase controller 35 controls the bias voltage to be supplied to the phase shifter 15a so that the I-Q phase difference detected by the phase difference detector 36 approaches the target value (that is, π/2).

However, a change in bias voltage affects the drift characteristics of the optical modulator. Thus, in consideration of the quality of the modulated optical signal, the method of providing an equivalent operation state in which the I-Q phase difference is π/2 by the digital signal processing is more preferable than the method of adjusting the I-Q phase difference to be from 3π/2 to π/2 by controlling the bias voltage.

Note that the output signal of the multiplier 21 representing the product of the drive signal I and the drive signal Q indicates a constellation state. For example, if the distribution of symbols mapped to each signal point is uniform, the average value of the output signal of the multiplier 21 is substantially zero. In this case, if the I-Q phase difference is controlled to be π/2 or 3π/2, the average value of the monitor signal is substantially zero. In other words, in this case, it is decided with high precision whether the I-Q phase difference is controlled to be either π/2 or 3π/2. Meanwhile, if the distribution of symbols mapped to each signal point is not uniform, the average value of the output signal of the multiplier 21 is not zero. In this case, even if the I-Q phase difference is controlled to be π/2 or 3π/2, the average value of the monitor signal may not be zero. In other words, in this case, it is not decided with high precision whether the I-Q phase difference is controlled to be either π/2 or 3π/2. Thus, the output signal of the multiplier 21 may be used as an indicator indicating the precision of the detection of the I-Q phase difference.

Figure 11:
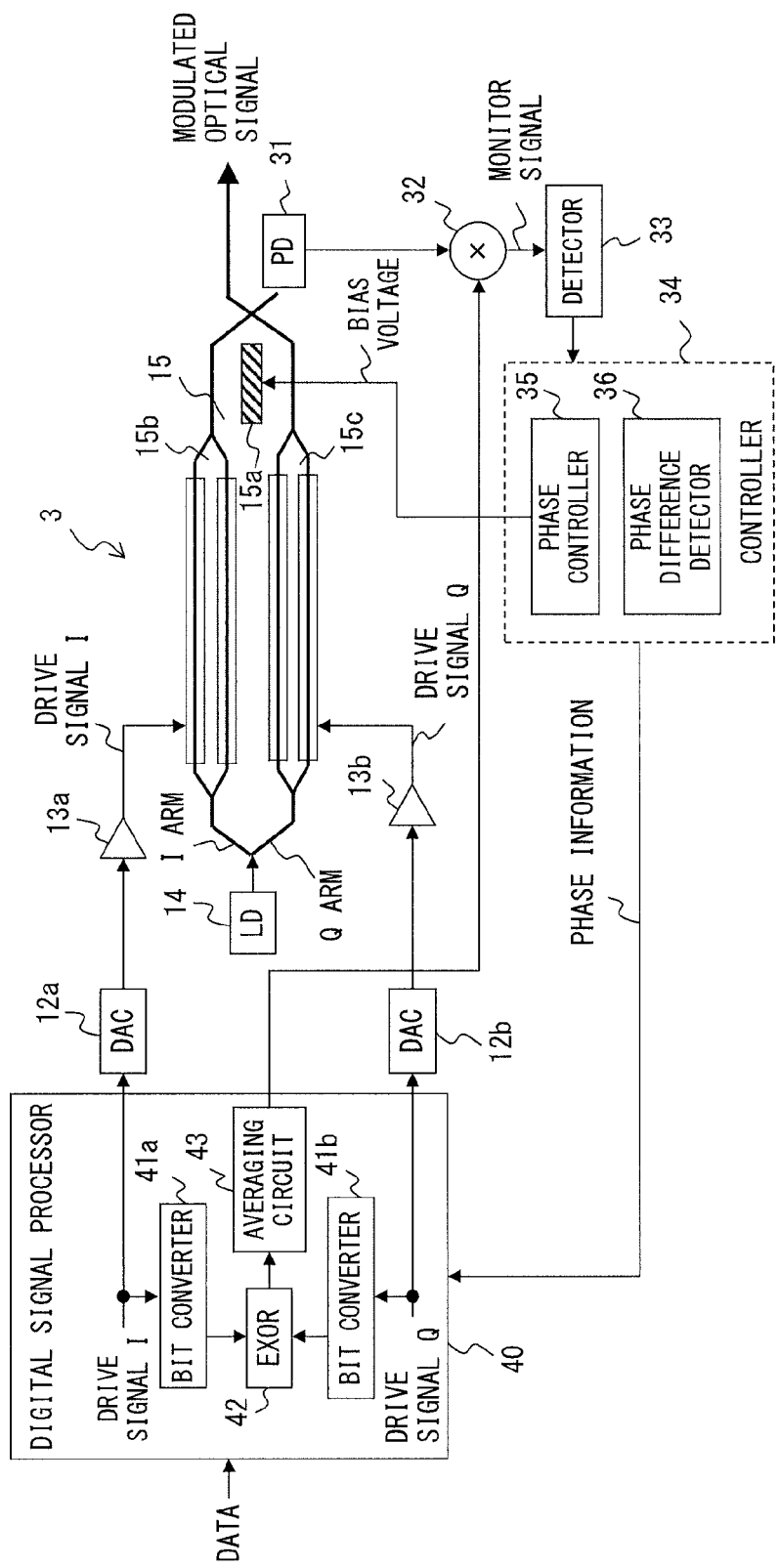
FIG. 11 illustrates a configuration of an optical transmitter according to another embodiment.

FIG. 11 illustrates a configuration of an optical transmitter according to another embodiment. The optical transmitter 3 illustrated in FIG. 11 generates a monitor signal by a method different from the optical transmitter 2 illustrated in FIG. 2.

The digital signal processor 40 generates the drive signal I and the drive signal Q from the input data in the same manner as the digital signal processor 20 illustrated in FIG. 2. Note that the digital signal processor 40 includes bit converters 41a and 41b and an exclusive OR circuit 42. The bit converter 41a converts an n-bit drive signal I into one-bit converted signal I. The conversion method is not particularly limited, but is implemented, for example, by extracting the drive signal I for each n bit and sampling one bit from each n-bit signal. Similarly, the bit converter 41b coverts an n-bit drive signal Q into one-bit converted signal Q. Note that "n" is an integer of 2 or more.

The exclusive OR circuit 42 outputs an exclusive OR between the converted signal I and the converted signal Q. Then, the multiplier 32 generates a monitor signal by multiplying an output signal of the exclusive OR circuit 42 by an electrical signal representing the output modulated optical signal. Note that the digital signal processor 40 may include an averaging circuit 43 for averaging the output signal of the exclusive OR circuit 42.

In the configuration illustrated in FIG. 2, the drive signals I and Q are multiplied to generate the monitor signal. In contrast, the optical transmitter 3 illustrated in FIG. 11 performs an exclusive OR between the converted signals I and Q. Here, the speed of the converted signals I and Q is 1/n of the drive signals I and Q. Thus, the configuration illustrated in FIG. 11 reduces the size of an arithmetic circuit or the number of operations of the digital signal processor 20.

Figure 12:
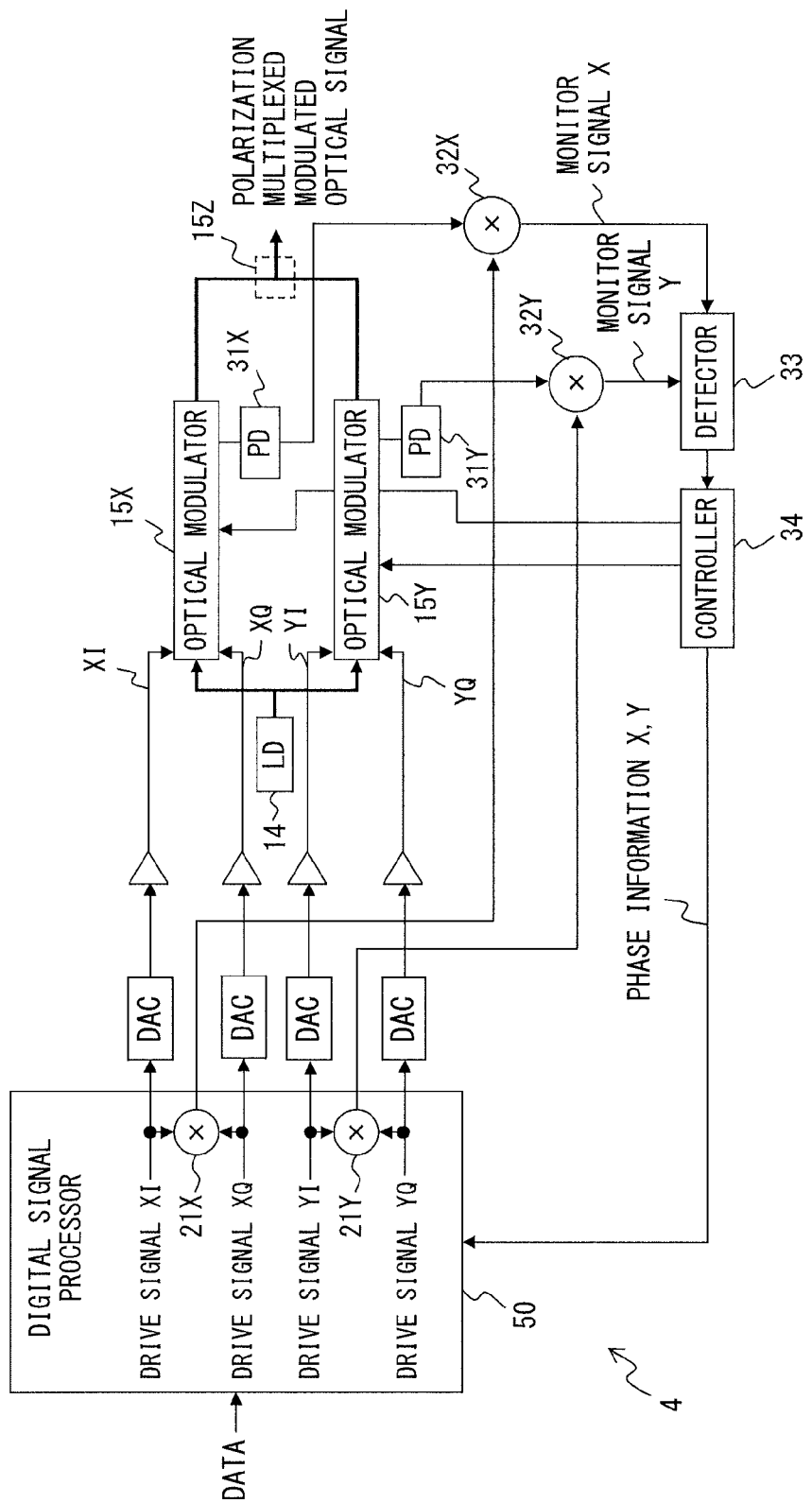
FIG. 12 illustrates a configuration of an optical transmitter according to still another embodiment.

FIG. 12 illustrates a configuration of an optical transmitter according to still another embodiment. The optical transmitter 4 illustrated in FIG. 12 can generate a polarization multiplexed modulated optical signal.

The optical transmitter 4 includes a digital signal processor 50, a light source 14, optical modulators 15X and 15Y, a polarization multiplexer 15Z, photo detectors 31X and 31Y, multipliers 32X and 32Y, a detector 33, and controller 34. The digital signal processor 50 generates drive signals XI, XQ, YI, and YQ from input data. The continuous wave light generated by the light source 14 is guided to the optical modulators 15X and 15Y. The optical modulator 15X generates the modulated optical signal X by modulating the continuous wave light in response to the drive signals XI and XQ. The optical modulator 15Y generates the modulated optical signal Y by modulating the continuous wave light in response to the drive signals YI and YQ. The polarization multiplexer 15Z generates a polarization multiplexed modulated optical signal from the modulated optical signal X and the modulated optical signal Y.

Regarding each of the modulated optical signals X and Y, the method of generating the monitor signals X and Y is substantially the same as that for the optical transmitter 2 illustrated in FIG. 2. More specifically, the multiplier 21X multiplies the drive signal XI and the drive signal XQ. The photo detector 31X converts the modulated optical signal X into an electrical signal. The multiplier 32X generates the monitor signal X by multiplying an output signal of the multiplier 21X by an electrical signal representing the modulated optical signal X. Likewise, the multiplier 21Y, the photo detector 31Y, and the multiplier 32Y generate the monitor signal Y.

The detector 33 outputs monitor sign information corresponding to each of the monitor signals X and Y. The controller 34 detects the I-Q phase difference of the optical modulator 15X based on the monitor sign information of the monitor signal X, and detects the I-Q phase difference of the optical modulator 15Y based on the monitor sign information of the monitor signal Y. The method of detecting the corresponding I-Q phase difference based on the monitor signals X and Y is substantially the same as that for the optical transmitter 2 illustrated in FIG. 2. Then, the controller 34 notifies the digital signal processor 50 of the phase information X and Y each representing the detection result.

The digital signal processor 50 sets parameters for generating the drive signals XI and XQ from the input data based on the phase information X. In addition, the digital signal processor 50 sets parameters for generating the drive signals YI and YQ from the input data based on the phase information Y. The method of setting the parameters based on the phase information X and Y is substantially the same as that for the optical transmitter 2 illustrated in FIG. 2.

The controller 34 may detect the I-Q phase differences of the optical modulators 15X and 15Y in parallel. Alternatively, the controller 34 may detect the I-Q phase difference of one of the optical modulators 15X and 15Y and then may detect the I-Q phase difference of the other one of the optical modulators 15X and 15Y.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
    an optical modulator including a first modulation unit and a second modulation unit respectively configured to propagate a first optical signal and a second optical signal that are obtained by splitting input light;
    a signal generator configured to generate a first drive signal and a second drive signal that are respectively supplied to the first modulation unit and the second modulation unit;
    a phase controller configured to control a phase difference between the first optical signal and the second optical signal in the optical modulator;
    a multiplier circuit configured to multiply the first drive signal, the second drive signal, and an electrical signal representing an output signal of the optical modulator; and
    a phase difference detector configured to detect the phase difference between the first optical signal and the second optical signal controlled by the phase controller based on an output signal of the multiplier circuit, wherein
    the signal generator generates the first drive signal and the second drive signal based on the phase difference detected by the phase difference detector.

2. The optical transmitter according to claim 1, wherein the signal generator controls a parameter for generating the first drive signal and the second drive signal from input data based on the phase difference detected by the phase difference detector.

3. The optical transmitter according to claim 1, wherein the signal generator generates the first drive signal and the second drive signal by mapping the input data to a constellation based on the phase difference detected by the phase difference detector.

4. The optical transmitter according to claim 1, wherein the signal generator has a chromatic dispersion pre-equalizer configured to control a chromatic dispersion to be added to the optical signal generated by the optical modulator, and
    the chromatic dispersion pre-equalizer generates the first drive signal and the second drive signal so that the chromatic dispersion corresponding to the phase difference detected by the phase difference detector is added to the optical signal.

5. The optical transmitter according to claim 1, wherein the signal generator has a frequency offset controller configured to control a frequency offset to be added to the optical signal generated by the optical modulator, and
    the frequency offset controller generates the first drive signal and the second drive signal so that the frequency offset corresponding to the phase difference detected by the phase difference detector is added to the optical signal.

6. The optical transmitter according to claim 1, wherein
the phase controller controls the phase difference between the first optical signal and the second optical signal to be a first specified value or a second specified value; and
the phase difference detector decides whether the phase difference between the first optical signal and the second optical signal is controlled to be either the first specified value or the second specified value based on the output signal of the multiplier circuit.

7. The optical transmitter according to claim 6, wherein
the signal generator generates the first drive signal and the second drive signal based on whether the phase difference between the first optical signal and the second optical signal is controlled to be either the first specified value or the second specified value.

8. The optical transmitter according to claim 6, wherein
the first specified value is $\pi/2+2n\pi$, and the second specified value is $3\pi/2+2n\pi$, where n is any integer including zero.

9. The optical transmitter according to claim 1, wherein
the phase controller controls the phase difference between the first optical signal and the second optical signal to be the first specified value or the second specified value by controlling a bias voltage that is supplied to the optical modulator; and
the phase difference detector detects the bias voltage when the phase difference between the first optical signal and the second optical signal is controlled to be the first specified value or the second specified value, and decides whether the phase difference between the first optical signal and the second optical signal is controlled to be either the first specified value or the second specified value, based on a change in the output signal of the multiplier circuit near the detected bias voltage.

10. The optical transmitter according to claim 1, wherein
the multiplier circuit includes a first multiplier configured to multiply the first drive signal and the second drive signal, and a second multiplier configured to multiply an output signal of the first multiplier by an electrical signal representing the output signal of the optical modulator; and
precision of detection by the phase difference detector is decided based on the output signal of the first multiplier.

11. The optical transmitter according to claim 1, wherein
the phase controller controls the phase difference between the first optical signal and the second optical signal by controlling the bias voltage that is supplied to the optical modulator.

12. The optical transmitter according to claim 11, wherein
the phase controller controls the bias voltage that is supplied to the optical modulator so that the phase difference detected by the phase difference detector approaches a specified value.

13. An optical transmitter comprising:
an optical modulator including a first modulation unit and a second modulation unit respectively configured to propagate a first optical signal and a second optical signal that are obtained by splitting input light;
a signal generator configured to generate a first drive signal and a second drive signal that are respectively supplied to the first modulation unit and the second modulation unit;
a phase controller configured to control a phase difference between the first optical signal and the second optical signal in the optical modulator;
a converter configured to convert the first drive signal into a first converted signal having a number of bits less than the first drive signal and convert the second drive signal into a second converted signal having a number of bits less than the second drive signal;
a multiplier configured to multiply an exclusive OR signal between the first converted signal and the second converted signal by an electrical signal representing an output signal of the optical modulator; and
a phase difference detector configured to detect the phase difference based on the output signal of the multiplier, wherein
the signal generator generates the first drive signal and the second drive signal based on the phase difference detected by the phase difference detector.

14. An optical transmitter comprising:
a first optical modulator including a first modulation unit and a second modulation unit respectively configured to propagate a first optical signal and a second optical signal that are obtained by splitting input light;
a second optical modulator including a third modulation unit and a fourth modulation unit respectively configured to propagate a third optical signal and a fourth optical signal that are obtained by splitting input light;
a polarization multiplexer configured to generate a polarization multiplexed optical signal from a first modulated optical signal outputted from the first optical modulator and a second modulated optical signal outputted from the second optical modulator;
a signal generator configured to generate a first drive signal, a second drive signal, a third drive signal, and a fourth drive signal that are respectively supplied to the first modulation unit, the second modulation unit, the third modulation unit, and the fourth modulation unit;
a phase controller configured to control a phase difference between the first optical signal and the second optical signal in the first optical modulator and control the phase difference between the third optical signal and the fourth optical signal in the second optical modulator; and
a phase difference detector configured to detect the phase difference between the first optical signal and the second optical signal and detect the phase difference between the third optical signal and the fourth optical signal, wherein
the signal generator generates the first drive signal and the second drive signal based on the phase difference between the first optical signal and the second optical signal detected by the phase difference detector; and
the signal generator generates the third drive signal and the fourth drive signal based on the phase difference between the third optical signal and the fourth optical signal detected by the phase difference detector.

15. A method of generating a modulated optical signal using an optical modulator including a first modulation unit and a second modulation unit that respectively propagate a first optical signal and a second optical signal obtained by splitting input light, the method comprising:
supplying a first drive signal and a second drive signal to the first modulation unit and the second modulation unit respectively;
controlling a phase difference between the first optical signal and the second optical signal in the optical modulator to be a first specified value or a second specified value;
multiplying the first drive signal, the second drive signal, and an electrical signal representing an output signal of the optical modulator;

deciding whether the phase difference is controlled to be either the first specified value or the second specified value based on an output signal of the multiplier circuit; and correcting the first drive signal and the second drive signal based on whether the phase difference is controlled to be either the first specified value or the second specified value.

* * * * *